Patented Mar. 20, 1934

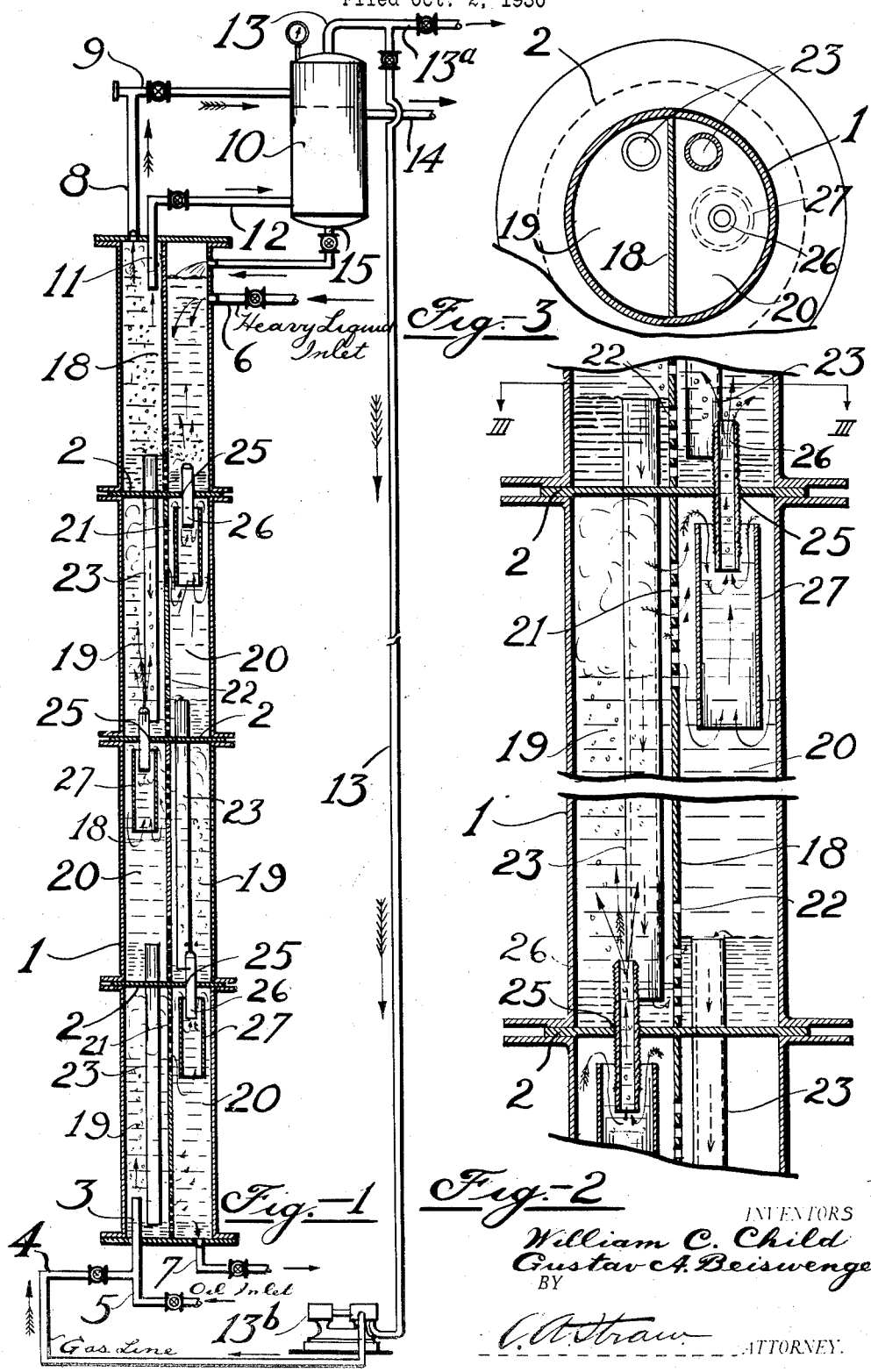

1,951,787

UNITED STATES PATENT OFFICE 1,951,787

METHOD AND APPARATUS FOR COUNTER-CURRENT TREATING

William C. Child, Roselle, and Gustav A. Beiswenger, Elizabeth, N. J., assignors to Standard Oil Development Company, a corporation of Delaware Application October 2, 1930, Serial No. 485,838

7 Claims. (Cl. 196—45)

This invention relates to the counter-current treatment of fluids. The invention will be fully understood from the following description, taken in connection with the accompanying drawing, in which latter Fig. 1 is a longitudinal sectional view of the apparatus, Fig. 2 is a longitudinal sectional view of a detail of the apparatus, and Fig. 3 is a transverse sectional view taken along the line III—III of Fig. 2.

Referring particularly to the drawing, the device comprises a tower 1 which is divided by horizontal plates 2 forming a plurality of sections. The tower is provided with an inlet 3 in its lowermost section through which gas and a relatively light liquid such as oil can be passed from lines 4 and 5 respectively. The tower has an inlet 6 in its uppermost section through which a relatively heavy liquid such as sulfuric acid, or the like, can be introduced. The relatively heavy liquid is withdrawn from the lower section through a line 7 after passing through the tower. The upper section of the tower is provided with a discharge line 8 through which the gas is discharged into a valved line 9, which in turn communicates with a separator 10. The upper section is provided also with a discharge 11 which communicates with a line 12 through which the treated lighter liquid is discharged into a lower portion of the separator 10. In the separator most of the entrained liquid is removed and the gas is preferably recycled through the tower via line 13 by means of pump 13b, although it may be conducted away through a line 13a to a suitable place of disposal or recovery of its oil content. The treated lighter liquid is withdrawn from separator 10 through a line 14 to a place of disposal, not shown. Sludge, or acid, or the like which settles in the lower portion of the separator 10 is returned to the agitation chamber of the upper section by means of a line 15.

Referring particularly to the structure of the sections, each section is divided laterally by a partition 18 into an agitation chamber 19 and a settling chamber 20. These chambers are arranged alternately on opposite sides of the tower. The partition 18 is provided with openings 21 and 22 at the upper and lower portions of the section, respectively. The agitation chamber 19 of each section contains a drain tube 23 which opens at its upper end into the superjacent settling chamber in spaced relation to the bottom of the chamber and discharges into the same agitation chamber, preferably near the bottom.

The top plate 2 of each settling chamber 20 is provided with an opening 25 in which there is a jet, or nozzle 26 opening into the lower portion of the superjacent agitation chamber 19. Baffle means are provided intermediate the portion of the jet 26 which protrudes into the settling chamber of each section and the openings 21 in the upper portion of the partition 18. In the preferred embodiment this baffle means comprises a settling tube 27 which is substantially vertically disposed in the settling chamber beneath and in spaced relation to the opening 25 and jet 26 and which extends upwardly beyond and downwardly below the openings 21.

In the following description reference will be made to oil and sulfuric acid, which are to be understood as illustrative of materials suitable for use in our method. In the construction described the mixture of gas, acid and oil which flows from the agitation chamber through the openings 21 to the settling chamber, is passed in a tortuous path whereby the acid is caused to settle from the mixture and flows down through tube 23. The gas passes over the upper end of the settling tube 27 to the inlet end of the jet 26. The oil flows up through settling tube 27 into the agitation chamber 20 above it also by means of jet 26.

In one way of operating the apparatus, the acid is fed in at the top of the tower 1. Oil such as naphtha is introduced at a pressure of approximately 20 lbs. per square inch through line 3. The oil and gas under pressure for agitation pass upward through the jets 26 and the acid flows downward through the drain pipes 23. Due to the injector action of the oil and the gas, acid is suspended in the rising oil and gas mixture in the agitation chambers. The turbulence of this rising mixture causes efficient contacting of the oil and acid. At the top of each section the mixture passes through openings in the partition 18. The openings in the partition preferably extend upwardly sufficiently above the acid level to provide for recirculation of part of the oil through the agitation chamber.

In the preferred embodiment the invention has been described as applied to the acid treating of naphtha. In such a process a minimum amount of acid is used in effecting the counter-current treatment. The gas used may be any inert gas such as carbon dioxide and is primarily used as an agitation medium. It is understood that the invention is not to be limited to the acid treating of petroleum distillates, but can be applied to the counter-current treatment of any two immiscible liquids of different gravities.

Various changes may be made within the scope of the appended claims, in which it is desired to claim all novelty inherent in the invention as broadly as the prior art permits.

I claim:

1. Counter-current treating apparatus, comprising a tower, plates dividing the tower into superposed horizontal sections, partition means dividing each section laterally into a vertical agitation chamber and a vertical settling chamber, said partition means having openings at its upper and lower portions, the agitation chamber of each section communicating with the settling chambers of the adjoining sections, the settling chamber of each section communicating with agitation chambers of the adjoining sections, and the tower having inlet openings in its top and bottom sections and discharge openings in its top and bottom sections.

2. Counter-current treating apparatus, comprising a tower, plates dividing the tower into superposed horizontal sections, partition means dividing each section laterally into a vertical agitation chamber and a vertical settling chamber, said partition means having openings at its upper and lower portions, said chambers being alternately arranged in the tower, means for passing a liquid from each settling chamber to the agitation chamber below it, and means for passing liquid from each settling chamber to the agitation chamber above it.

3. Counter-current treating apparatus, comprising a tower, a plurality of sections in the tower, each section comprising a settling chamber and an agitation chamber laterally disposed in the tower and communicating with each other, means for introducing a relatively heavy liquid into the top of the tower and means for withdrawing it at the bottom, means for introducing a relatively light liquid at the bottom of the tower and means for withdrawing it at the top, and means for passing the relatively heavy liquid downward through the tower through a plurality of alternate settling and agitation chambers, said last mentioned means comprising a drain tube communicating with the lower part of each settling chamber and extending substantially through the agitation chamber for discharge into the lower part of the same.

4. Apparatus according to claim 3, in which means are provided for causing the relatively light liquid to flow upward through the tower through a plurality of alternate agitation and settling chambers, said means comprising a device having an injector action and located at the bottom of each agitation chamber, said device being provided with baffle means through which the up-flowing relatively light liquid must pass and in which the heavier liquid settles out.

5. Apparatus according to claim 3, in which means are provided for introducing gas under pressure into the lower part of the tower and for causing the gas to pass with the relatively light liquid upward through the tower.

6. Method of effecting counter-current contact between relatively heavy and relatively light immiscible liquids, one of said liquids consisting of an oil and the other of a treating liquid, comprising flowing the heavier liquid downward through a plurality of series of an agitation and a settling zone, flowing the relatively light liquid upwardly in direct contact with the heavier liquid in said zones, continuously bringing streams of the relatively light and the relatively heavy liquids into contact with each other in the agitating zones in which the relatively light liquids enter the agitating zones adjacent the points at which the relatively heavy liquids enter the agitating zones, removing admixtures of the relatively light and the relatively heavy liquids at a plurality of points to the settling zones, and passing the relatively heavy liquid downwards and the relatively light liquid upwards from the settling zones.

7. Method of effecting counter-current contact between relatively light and relatively heavy immiscible liquids, one of said liquids consisting of an oil and the other of a treating liquid, comprising flowing the heavier liquid downward through a plurality of series of an agitation and a settling zone, flowing the lighter liquid upwardly through said zones while causing agitation by means of a gas under pressure passing upward with the lighter liquid continuously bringing streams of the relatively light and relatively heavy liquids into contact with each other in the agitating zones at the points where the relatively light and relatively heavy liquid enter the said agitating zones, continuously removing admixtures of relatively light and relatively heavy liquids at a plurality of points to the adjacent settling zones of the same series, and passing the relatively heavy liquid downward and the relatively light liquid upward from the settling zones.

WILLIAM C. CHILD.
GUSTAV A. BEISWENGER.